US012381230B2

(12) United States Patent
Song et al.

(10) Patent No.: US 12,381,230 B2
(45) Date of Patent: Aug. 5, 2025

(54) METHOD FOR PRODUCING MEMBRANE ELECTRODE

(71) Applicant: HOACO Automation Technology LLC, Sugar Land, TX (US)

(72) Inventors: Guanghui Song, Shandong (CN); Zhongqiang Liu, Shandong (CN); Yajun Bai, Shandong (CN); Guangpeng Shi, Shandong (CN); Tao Cui, Shandong (CN); Dalong Wang, Shandong (CN); Chengguang Wang, Shandong (CN)

(*) Notice: Subject to any disclaimer, the term of this patent is extended or adjusted under 35 U.S.C. 154(b) by 378 days.

(21) Appl. No.: 17/931,077

(22) Filed: Sep. 9, 2022

(65) Prior Publication Data
US 2023/0216064 A1     Jul. 6, 2023

(51) Int. Cl.
*H01M 4/88* (2006.01)

(52) U.S. Cl.
CPC ....... *H01M 4/8896* (2013.01); *H01M 4/8825* (2013.01); *H01M 4/8875* (2013.01)

(58) Field of Classification Search
CPC .......... H01M 2008/1095; H01M 4/88; H01M 4/8807; H01M 4/8814; H01M 4/8817; H01M 4/8825; H01M 4/8828; H01M 4/8875; H01M 4/8882; H01M 4/8896; H01M 8/0234; H01M 8/1004; Y02E 60/50; Y02P 70/50
See application file for complete search history.

(56) References Cited

U.S. PATENT DOCUMENTS

| 2017/0256810 | A1* | 9/2017 | Lee | H01M 8/0286 |
| 2018/0290441 | A1* | 10/2018 | Adachi | B32B 37/06 |
| 2019/0237788 | A1* | 8/2019 | Bettey | H01M 4/8807 |
| 2020/0153017 | A1* | 5/2020 | Hong | H01M 8/1004 |

FOREIGN PATENT DOCUMENTS

| CA | 2668458 A1 * | 5/2008 | H01M 4/86 |
| WO | WO-2021089093 A1 * | 5/2021 | B05D 5/12 |

OTHER PUBLICATIONS

Chen et al., Journal of engineering manufacture, 2020, vol. 234(1-20 66-74 (Year: 2020).*

* cited by examiner

*Primary Examiner* — Victoria H Lynch
(74) *Attorney, Agent, or Firm* — DAHYEE LAW GROUP; Lin Kong; Leon E. Jew

(57) ABSTRACT

A method for producing a membrane electrode comprises a thermal transfer printing step, a thermal combining step, a carbon paper attaching step and a hot-pressing step. The invention realizes the continuous automatic production of the membrane electrode and improves the production efficiency and the quality of the membrane electrode.

6 Claims, 7 Drawing Sheets

METHOD FOR PRODUCING MEMBRANE ELECTRODE

FIELD OF THE INVENTION

The present invention relates to the technical field of membrane electrode production. More specifically, it relates to a method for producing a membrane electrode.

BACKGROUND OF THE INVENTION

Hydrogen energy is known as the ultimate energy of the twenty-first century and represents the development direction of clean energy. It has risen to the national energy strategy of many major developed countries around the world. It can realize zero emission in a real sense, and it is the most safe and efficient known clean energy.

The fuel cell, also known as electrochemical generator, is a chemical device which directly converts chemical energy of fuel into electric energy and is a clean power generation technology after hydroelectric power generation, thermal power generation and atomic power generation. Since the fuel cell converts Gibbs free energy in the chemical energy of the fuel into electric energy through electrochemical reaction and is not limited by Carnot cycle effect, it has a high efficiency. In addition, since fuel and oxygen are used as raw materials for fuel cells and there is no need for mechanical transmission components, it will not produce any noise pollution and there is very little emission of harmful gases. Therefore, from the viewpoint of energy saving and ecological environment protection, fuel cells are the most promising power generation technology.

The hydrogen fuel cell is a power generation device which directly converts chemical energy of hydrogen and oxygen into electric energy, and the basic principle is the reverse reaction of electrolytic water, where hydrogen and oxygen are respectively supplied to an anode and a cathode, the hydrogen diffuses through the anode, electrons are released under the action of a catalyst and reach the cathode through an external load, and hydrogen atoms without the electrons (protons) penetrate through a proton exchange membrane to reach the cathode and are combined with oxygen atoms to produce water. As the fuel cell 'chip', the membrane electrode mainly includes a proton exchange membrane, a catalyst layer, and a gas diffusion layer (carbon cloth). A typical arrangement structure of the membrane electrode is as follows: a first gas diffusion layer, an anode catalyst layer, a proton exchange membrane, a cathode catalyst layer and a second gas diffusion layer. The membrane electrode is produced by arranging an anode catalyst layer and a cathode catalyst layer on a proton exchange membrane and two materials are required to be used during production. The two materials are defined as material A and material B respectively, and the specific structures of the two materials are as follows:

Material A: "material A" is a three-layer structure and includes a protective film and a lining film. A proton exchange membrane is arranged between the protective film and the lining film, the protective film is positioned on the outer side, and a cathode catalyst layer is arranged on one side of the proton exchange membrane, which is attached to the protective film; and Material B: "material B" is a two-layer structure and includes a lining film. The inner side of the lining film is coated with the anode catalyst layer, which typically contains platinum and is expensive to produce.

In addition, the gas diffusion layer generally includes carbon paper/carbon cloth and a microporous layer supported thereon.

The membrane electrode is the most central component of a Proton Exchange Membrane Fuel Cell (PEMFC), is a heterogeneous material transfer and electrochemical reaction site for energy conversion it involves a three-phase interfacial reaction and a complex mass and heat transfer process, and directly determines the performance, life, and cost of the PEMFC.

Therefore, the development of the membrane electrode combining equipment and the method for producing the membrane electrode not only have pressing research values, but also have great economic benefits and industrial application potentials.

SUMMARY OF THE INVENTION

To overcome the shortcomings of the prior art methods, the present invention provides a method for producing the membrane electrode, which realizes the continuous automatic production of the membrane electrode and improves the production efficiency and the quality of the membrane electrode.

In one preferred embodiment according to the present invention, a method for producing a membrane electrode is disclosed. The method includes a thermal transfer printing step, a thermal combining step, a carbon paper attaching step and a hot pressing step. The thermal transfer printing step includes:

S11: perform thermal transfer printing on a material A and a material B, so that an anode catalyst layer on the material B is thermal transfer printed to a proton exchange membrane of the material A, forming a post-material A after thermal transfer printing;

S12: perform rolling of the post-material A and the material B to ensure that the anode catalyst layer on the material B is firmly combined with the proton exchange membrane of the material A, and wind the post-material A after rolling;

The thermal combining step includes:

S21: manufacture an upper frame material strip and a lower frame material strip, discharge the post-material A after winding from step S12 and cut into sheets, attach the post-material A to the top of the lower frame material strip, then apply heating and rolling; and S22: place the upper frame material strip on top of the post-material A, apply heating and rolling to the upper frame material strip, the post-material A, and the lower frame material strip together to form a semi-finished material strip, and wind the semi-finished material strip;

The carbon paper attaching step includes:

S31: discharge the semi-finished material strip after winding from step S22, and attach plurality of carbon paper to the top and the bottom of the semi-finished material strip; and S32: by heating and rolling, combine the semi-finished material strip after attaching the plurality of carbon paper, cut the semi-finished material strip into sheets with a designed shape, and collect the sheet material; and the hot pressing method includes:

S41: perform hot pressing on the sheet material collected in step S32 to create a finished membrane electrode product.

In one preferred embodiment of present invention, in the thermal transfer printing step, before performing thermal transfer printing on the material A and material B, remove a lining film from the material A from the side adjacent to the material B, place a plurality of high temperature cloth respectively below the material A and above the material B, and apply thermal transfer printing to the plurality of high temperature cloths, the material A and the material B; and after rolling of the post-material A and the material B, wind the plurality of high temperature cloths, and at the same time, wind the material B without the anode catalyst layer.

In one preferred embodiment of present invention, the upper frame material strip and the lower frame material strip in the thermal combining method are manufactured in steps comprising:

S51: perform rolling and conveying on a pressure-sensitive double-sided adhesive material strip, a release film, and a silicon protective film tape together, perform frame cutting after rolling and conveying, and perform winding of frame scraps after frame cutting; and S52: after placing a PEN hot melt adhesive on the surface of the material strip after frame cutting from step S51, perform outline cutting of the PEN hot melt adhesive, perform rolling an included film of the PEN hot melt adhesive after frame cutting, and take the material strip after frame cutting as an upper frame material strip or a lower frame material strip.

In one preferred embodiment of present invention, in the manufacturing steps of the upper frame material strip and the lower frame material strip, before the rolled material strip is subjected to frame cutting, a dummy film is arranged above a release film, and perform winding after frame cutting; and after frame cutting, place a waste discharging adhesive tape above the material strip, perform winding residual waste material strip through the waste discharging adhesive tape.

In one preferred embodiment of present invention, in the manufacturing steps of the upper frame material strip and the lower frame material strip, before frame cutting of the PEN hot melt adhesive, place a low-viscosity film below the silicon protective film tape, and perform winding of scraps from frame cutting of the PEN hot melt adhesive through the low-viscosity film.

In one preferred embodiment of present invention, in the manufacturing steps of the upper frame material strip and the lower frame material strip, before rolling of the pressure-sensitive double-sided adhesive material strip and the silicon protective film material strip, remove an included paper on a side of the pressure-sensitive double-sided adhesive material strip that is adjacent to the release film, and after rolling, remove an included paper on the other side of the pressure-sensitive double-sided adhesive material strip.

In one preferred embodiment of present invention, in the thermal combining step, before the shaped post-material A sheet is attached onto the lower frame material strip, the lower frame material strip is heated, and hot air blowing is performed after attaching; and before the semi-finished material strip is wound, the silicon protective film and inner frame of the PEN hot melt adhesive are rolled, and second protective layers are added to the top of the upper frame material strip and to the bottom of the lower frame material strip, respectively.

In one preferred embodiment of present invention, in the carbon paper attaching step, before the plurality of carbon paper is respectively attached to the top and the bottom of the semi-finished material strip, the second protective layers added to the top and the bottom of the semi-finished material strip are removed, and third protective layers are added to the top and the bottom of the semi-finished material strip after the plurality of carbon paper is attached.

In one preferred embodiment of present invention, in the carbon paper attaching step, before the material strip is cut into the sheet material with a designed shape, perform cutting of the material strip after combining with heating and rolling, and perform winding of the material strip after cutting.

In one preferred embodiment of present invention, in the hot pressing step, the collected sheet material is placed on a hot pressing equipment to be subjected to hot pressing to create the finished membrane electrode product, and after the hot pressing method is finished, the finished membrane electrode product is taken out and stored.

The present invention realizes the continuous automatic production of the membrane electrode and improves the production efficiency and the quality of the membrane electrode.

BRIEF DESCRIPTION OF DRAWINGS

In FIG. 1A through FIG. 8, each numerical designation refers to a particular meaning, element, and/or component, respectively, as follows in the figures:

1. material A; 101. a proton exchange membrane; 102. a cathode catalyst layer; 2. material B; 201. an anode catalyst layer; 3. an upper frame material strip; 4. a lower frame material strip; 5. carbon paper; 6. high-temperature cloth; 7. a pressure-sensitive double-sided adhesive material strip; 8. a release film; 9. a silicon protective film material strip; 10. PEN hot melt adhesive; 11. a dummy film; 12. waste discharge adhesive tape; 13. a low-viscosity film; 14. a first protective layer; 15. a material A liner film collecting roller; 16. a thermal combining cutter holder; 17. a rolling cutter holder; 18. a post-material A after thermal transfer printing; 19. a high-temperature cloth collecting roller; 20. a material B liner film collecting roller; 21. a pressure-sensitive adhesive paper collecting roller; 22. a frame cutting cutter holder; 23. a border scraps winding roller; 24. a waste discharge adhesive tape winding roller; 25. a dummy film winding roller; 26. an outline cutting cutter holder; 27. a PEN hot melt adhesive film; 28. a low-viscosity film winding roller; 29. a first attaching cutter holder; 30. a heating plate; 31. a first heating and rolling cutter holder; 32. a first waste collecting roller; 33. a semi-finished material strip; 34. a second protective layer; 35. a second waste collecting roller; 36. a second attaching cutter holder; 37. a third protective layer; 38. a preheating oven; 39. a second heating and rolling cutter holder; 40. a cutting cutter holder; 41. an outer frame waste winding roller; 42. an outline waste winding roller; 43. a lifting bin; 44. a manipulator, and 45. a hot pressing equipment.

DETAILED DESCRIPTION OF THE INVENTION

The invention is further illustrated by the following specific embodiments. The use and purpose of these exemplary embodiments are to illustrate the present invention, not to limit the actual scope of the present invention in any way.

Figure 1A:
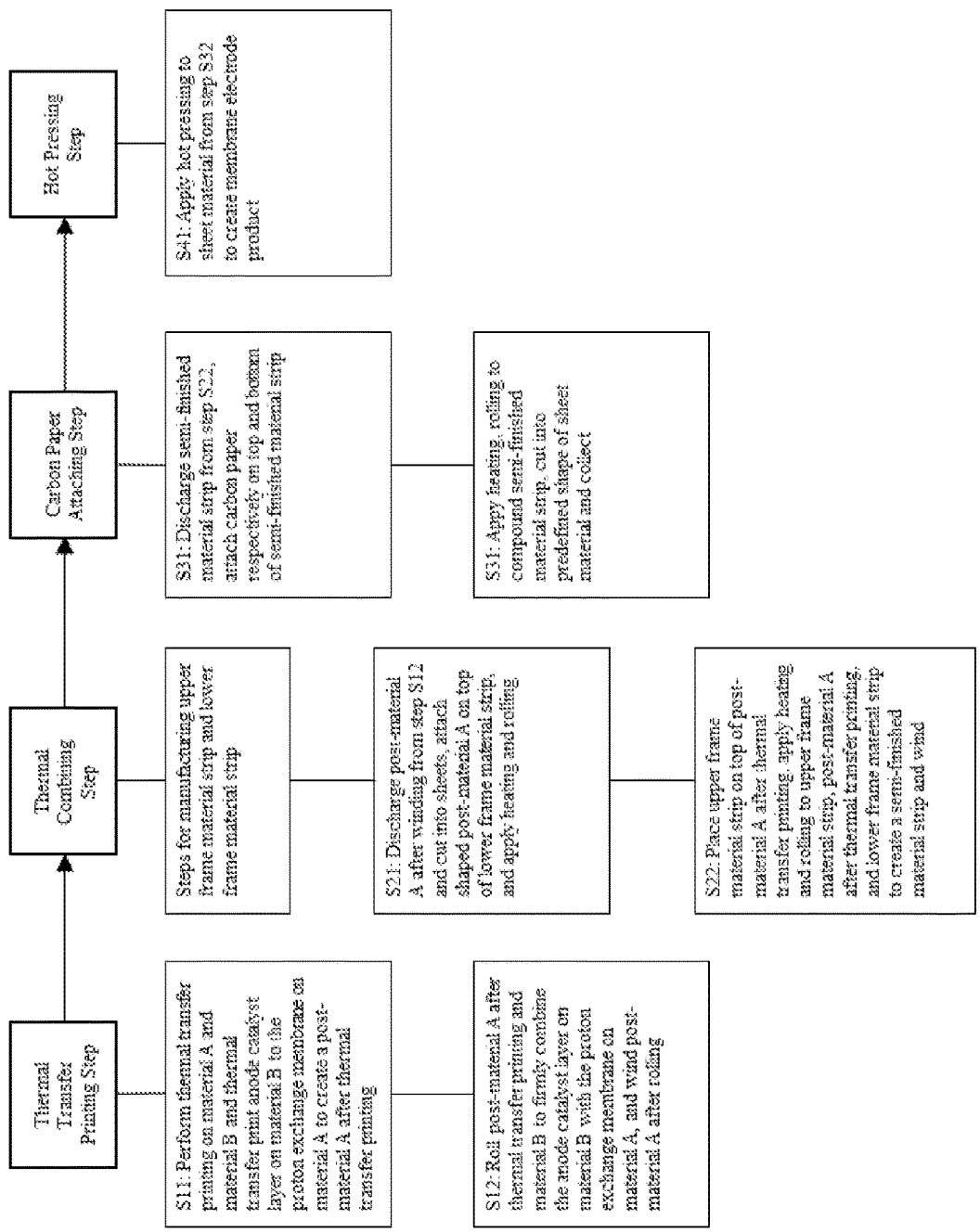
FIG. 1A is a flow chart of one preferred embodiment of the present invention.
Figure 1B:
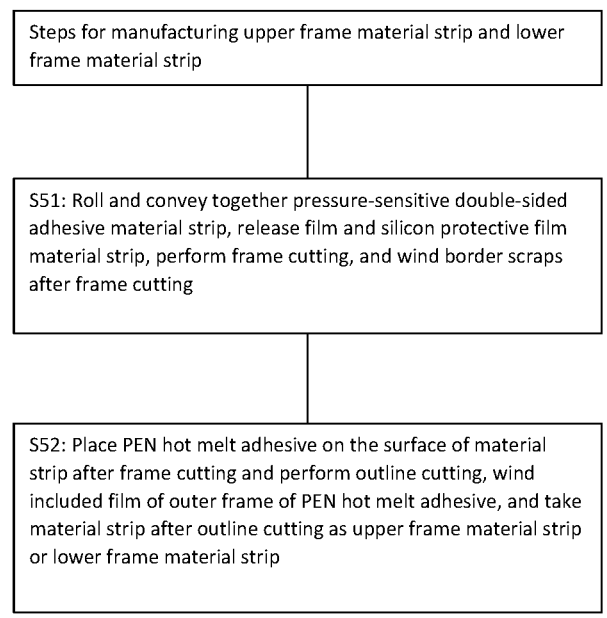
FIG. 1B is a flow chart of the steps for manufacturing an upper frame material strip or a lower frame material strip according to one preferred embodiment of the present invention.
Figure 2:
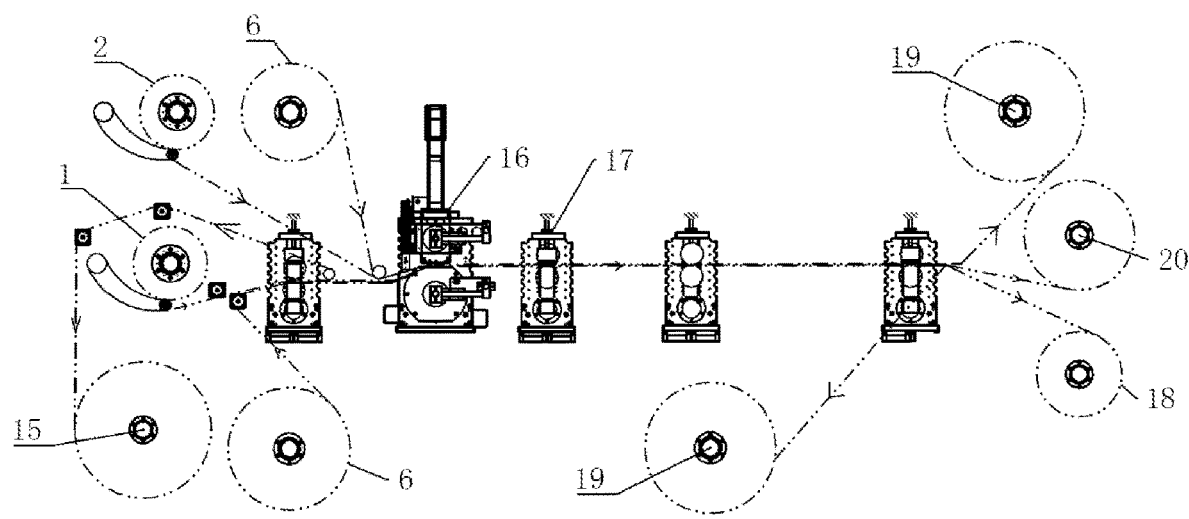
FIG. 2 is a schematic flow chart diagram of a thermal transfer printing step according to one preferred embodiment of the present invention.
Figure 3:
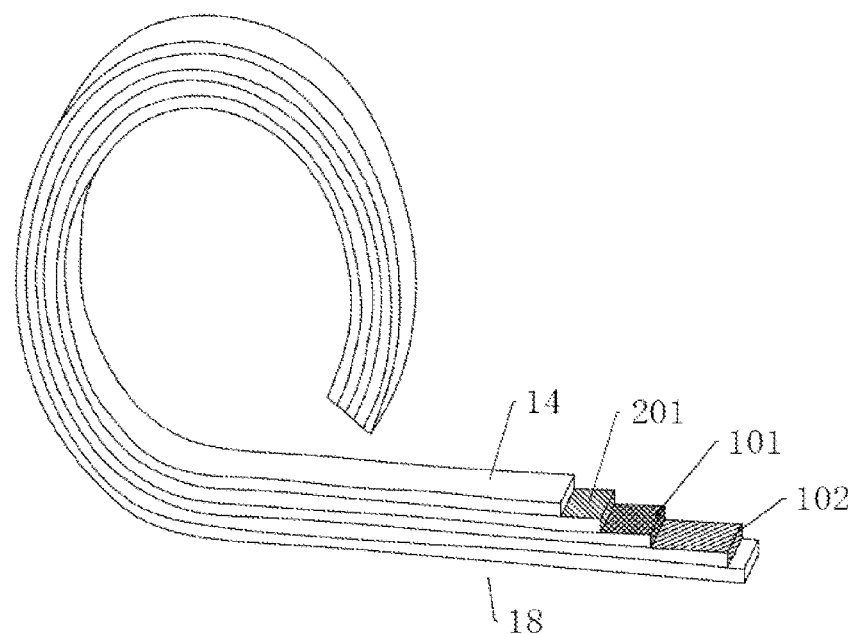
FIG. 3 is a schematic structural view of a post-material A after thermal transfer printing step according to one preferred embodiment of the present invention.
Figure 4:
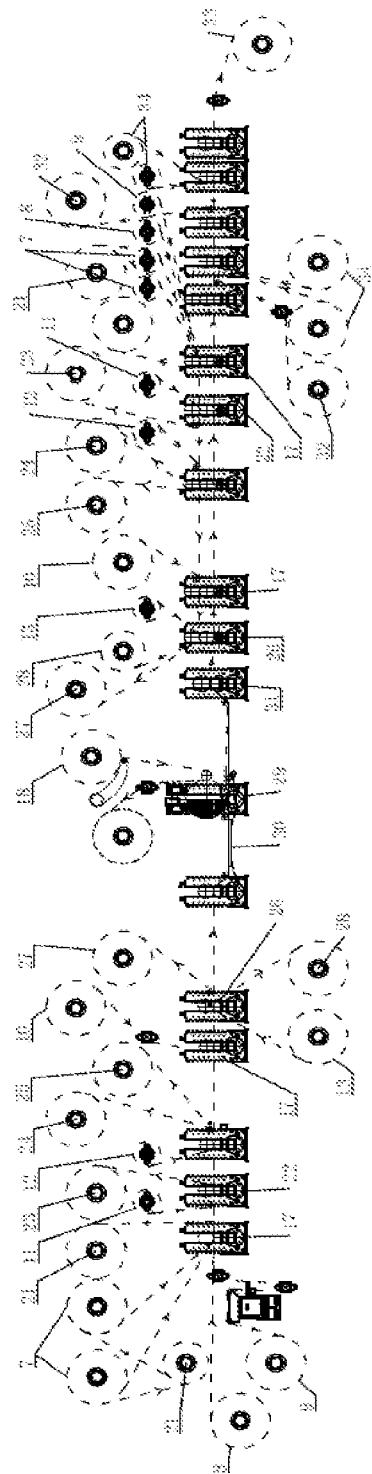
FIG. 4 is a schematic flow chart diagram of a thermal combining step according to one preferred embodiment of the present invention.
Figure 5:
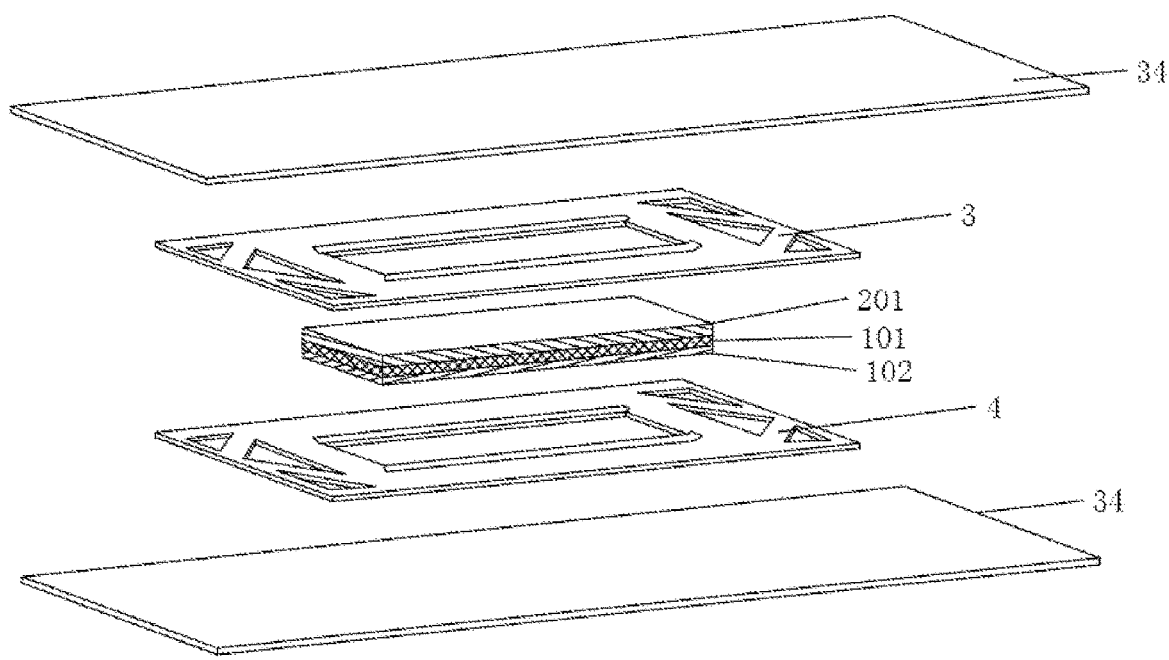
FIG. 5 is a schematic view of a semi-finished material strip of one preferred embodiment of the present invention.
Figure 6:
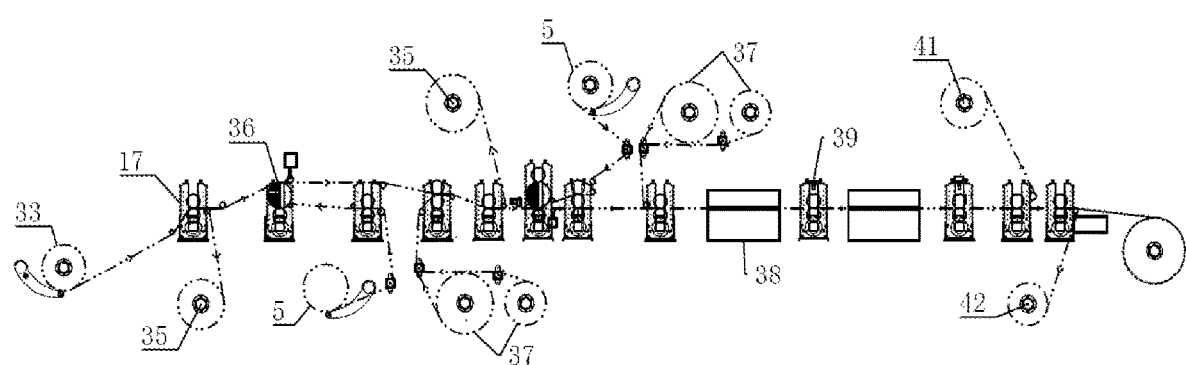
FIG. 6 is a schematic flow chart diagram of a carbon paper attaching step according to one preferred embodiment of the present invention.
Figure 7:
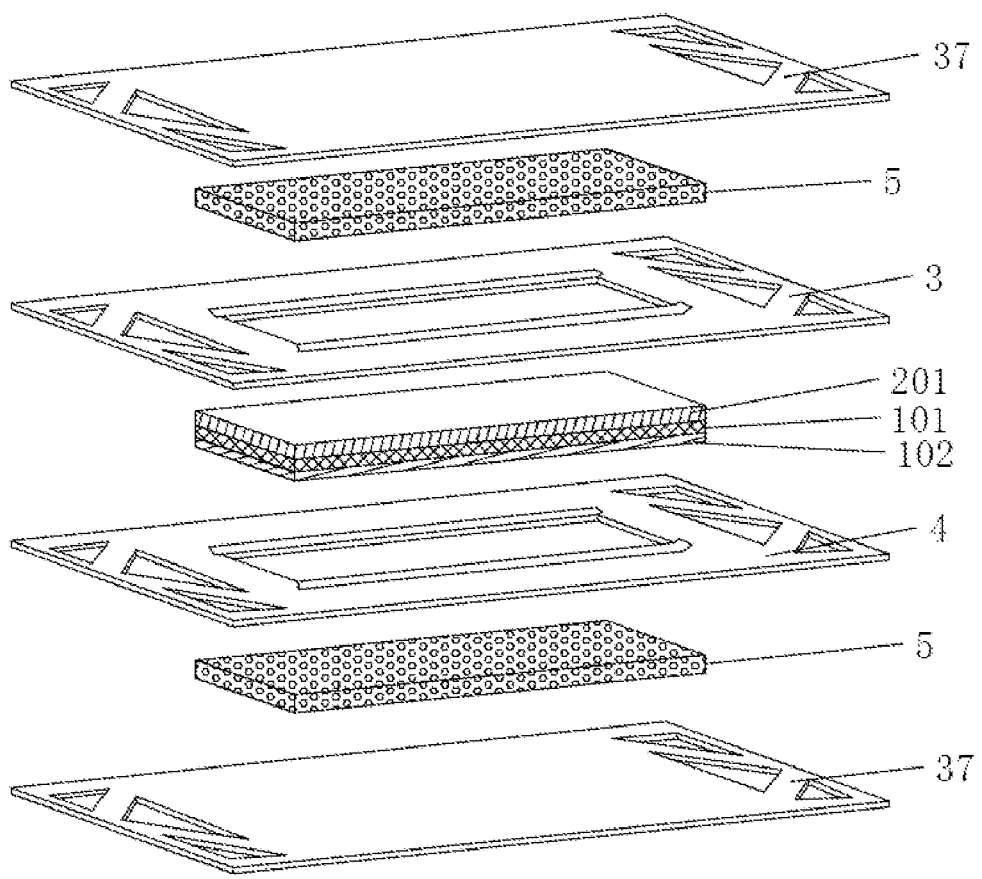
FIG. 7 is a schematic view of an exploded structure of a membrane electrode assembly according to one preferred embodiment of the present invention.
Figure 8:
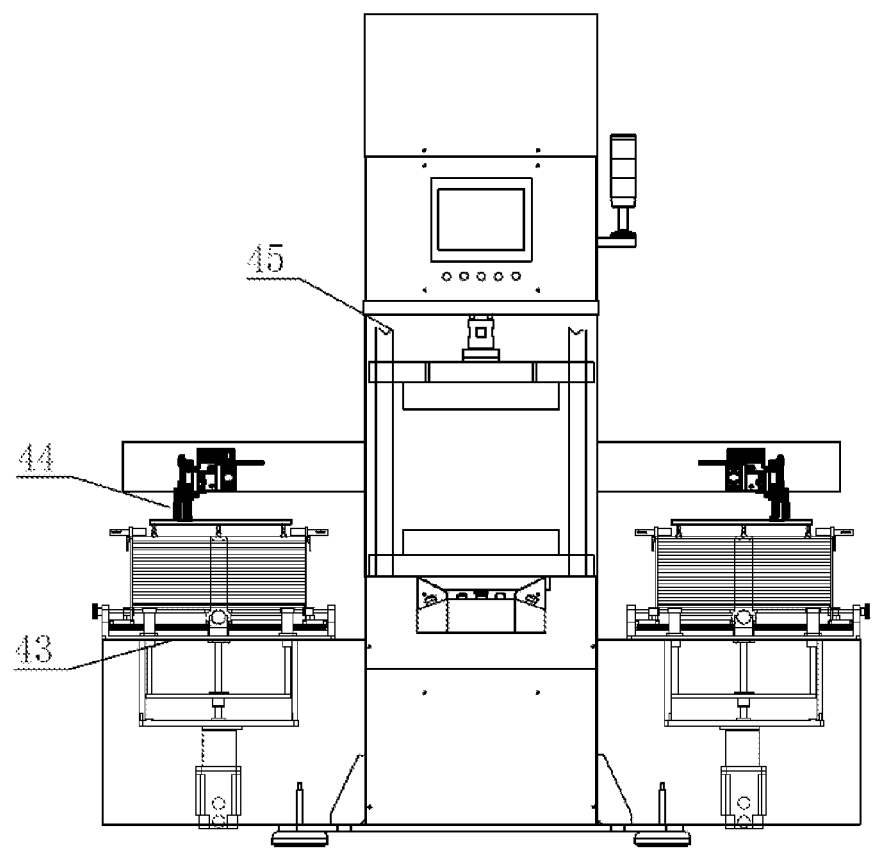
FIG. 8 is a schematic flow chart diagram of a hot pressing step according to one preferred embodiment of the present invention.

Now referring to FIG. 1A, FIG. 1B, and FIGS. 2 to 8, a method for producing a membrane electrode is disclosed according to one preferred embodiment of the present invention. The method includes a thermal transfer step, a thermal composite step, a carbon paper attaching step, and a hot pressing step.

The thermal transfer printing step includes the following steps:

S11: before thermal transfer printing, respectively place a material A and a material B on a material shaft, draw the material A through a rolling cutter holder 17, remove a lining film of the material A on one side, which is to be attached to the material B, roll the lining film of the material A through a lining film collecting roller 15, then place high-temperature cloth 6 respectively below the material A and above the material B, respectively place coiled materials of the high-temperature cloth 6 on the material shaft, and perform thermal transfer printing on the high-temperature cloth 6, the material A and the material B together through a thermal combining cutter holder 16 to ensure that an anode catalyst layer 201 on the material B is thermal transfer printed onto a proton exchange membrane 101 of the material A to form a material A post thermal transfer printing 18. The post-material A after thermal transfer printing 18 includes a proton exchange membrane 101 in the middle, an anode catalyst layer 201 from thermal transfer printing in the upper layer and a cathode catalyst layer 102 included in material A in the lower layer; and S12: perform rolling to the material A post thermal transfer printing 18 and material B through a plurality of rolling cutter holders 17 to firmly combine the anode catalyst layer 201 on the material B with the proton exchange membrane 101 of the material A, perform winding to the post-material A after thermal transfer printing 18 after rolling, concurrently perform rolling of the high-temperature cloth 6 placed at the bottom of the material A and at the top of the material B through a high-temperature cloth collecting roller 19, and perform rolling of the residual lining film of the material B after the anode catalyst layer 201 is lost through a material B lining film collecting roller 20;

in addition, to protect the material A post thermal transfer printing 18 from damage, a first protective layer 14 may be placed at the top and the bottom of the post-material A after thermal transfer printing 18, and the first protective layer 14 is removed before use.

The thermal combining step includes the following steps:

The manufacturing steps for manufacturing the upper frame material strip 3 and the lower frame material strip 4 include:

S51: place a pressure-sensitive double-sided material strip 7, a release film 8 and a silicon protective film material strip 9 on a conveying roller, the two pressure-sensitive double-sided material strip 7 being respectively positioned at two sides of the release film 8, remove the included paper on the pressure-sensitive double-sided material strip 7 adjacent to one side of the release film 8, roll the included paper through a pressure-sensitive adhesive paper collecting roller 21, and jointly enter a rolling cutter holder 17 for rolling and conveying. After the rolling and conveying, remove included paper at the other side of the pressure-sensitive double-sided material strip 7. In the meantime, place a dummy film 11 above the release film 8, perform frame cutting by a frame cutting cutter holder 22, perform rolling of border scraps from frame cutting by a border scrap rolling roller 23. After frame cutting, place a waste discharge adhesive tape 12 above the material strip after frame cutting, and perform winding of the border scraps from frame cutting by a waste discharge adhesive tape winding roller 24. In the meantime, wind the dummy film 11, which is placed before frame cutting, through a dummy film winding roller 25; and S52: place a PEN hot melt adhesive 10 on the surface of the material strip after frame cutting, perform combining of the PEN hot melt adhesive 10 on the material strip after frame cutting through a rolling cutter holder 17, then perform outline cutting to the PEN hot melt adhesive 10 through an outline cutting cutter holder 26, perform winding of a PEN hot melt adhesive film 27 after outline cutting, where the material strip subjected to outline cutting is used as an upper frame material strip 3 or a lower frame material strip 4. Before outline cutting of the PEN hot melt adhesive 10, place a low-viscosity film 13 below the silicon protective film material strip 9, perform winding of waste materials from outline cutting of the PEN hot melt adhesive 10 through the low-viscosity film 13 through a low-viscosity film winding roller 28.

The step of disposing the material A post thermal transfer printing 18 between the upper frame material strip 3 and the lower frame material strip 4 and thermal combining of the materials includes:

S21: place material A post thermal transfer printing 18 from step S12 on a roller, removing a protective film if it is provided on the surface of the post-material A after thermal transfer printing 18, and thereafter, cut the free end of the post-material A after thermal transfer printing 18 into a sheet shape by a first attaching cutter holder 29, and attach it to the upper side of the lower frame material strip 4. Before the lower frame material strip 4 is attached to the post-material A after thermal transfer printing 18, heat the lower frame material strip 4 by the heating plate 30. After attaching through the first attaching cutter holder 29, perform hot air blowing to the lower frame material strip 4 and the sheet-shaped post-material A after thermal transfer printing 18, so that the shaped post-material A sheet after thermal transfer printing 18 is combined with the lower frame material strip 4 more tightly, reducing gaps and bubbles. Heating and rolling the shaped post-material A sheet after thermal transfer printing 18 and the lower frame material strip 4 through a first heating and rolling cutter holder 31, and the first heating and rolling cutter holder 31 adopts a heating roller; and S22: place upper frame material strip 3 at the top of post-material A after thermal transfer printing 18. Then, convey the upper frame material strip 3, post-material A after thermal transfer printing 1 and lower frame material strip 4 jointly through a rolling cutter holder 17. During the conveying process, perform rolling of the silicon protection film on upper frame material strip 3 and lower frame material strip 4, and the inner frame of the PEN hot melt adhesive 10 through a first collection waste roller 32. Concurrently, add a plurality of second protective layers 34 respectively to the top of upper frame material strip 3 and to the bottom of the lower frame material strip 4, where the second protective layers 34 adopt a dummy film 11 and silicon protection film. Then, perform heating and rolling jointly to make a semi-finished material strip 33, and wind the semi-finished material strip 33 after rolling. After winding, the semi-finished material strip 33 includes: the shaped post-material A sheet after thermal transfer printing 18 in the middle, the upper frame material strip 3 which are attached to the upper part and the lower frame material strip 4 which are attached to the lower part of the material A post thermal transfer printing 18, and dummy film 11 and the silicon protective film in the outermost layer.

The carbon paper 5 attaching step includes the following steps:

S31: place the semi-finished material strip 33 after winding from step S22 on a material shaft and discharge, perform conveying of the semi-finished material strip 33 through the rolling cutter holder 17, removing the dummy films 11 and the silicon protective films placed above and below the semi-finished material strip 33 from step S22 during the conveying process, and perform rolling of the semi-finished material strip 33 by using a second waste collecting roller 35;

place the carbon paper 5 on a material shaft and discharge, perform conveying of the carbon paper 5 to a second attaching cutting holder 36 through the rolling cutting holder 17 to be cut into sheet shapes, attach the sheets respectively to the top and bottom of the semi-finished material strip 33. After attaching the carbon paper 5, add a third protective layer 37 to the top and the bottom of the semi-finished material strip 33, and the third protective layer 37 also adopts a dummy film 11 and a silicon protective film; and S32: the semi-finished material strip 33 after attaching the carbon paper 5 sequentially passes through a preheating oven 38 and a second heating and rolling cutter holder 39, where the second heating and rolling cutter holder 39 adopts an electromagnetic heating roller to heat and roll and compound the material strip. Perform cutting of the material strip through a cutting cutter holder 40, perform winding of outer frame waste from frame cutting through an outer frame waste winding roller 41, perform winding of outline waste through an outline waste winding roller 42, collect the material strip after cutting in sheet materials. In addition, the material strip can also be wound. And perform cutting of the material strip into sheets through a special cutting device.

The hot pressing step includes the following steps:

S41: place the sheet materials collected from step S32 into a lifting bin 43, sequentially place the sheet materials on a hot pressing equipment 45 through a manipulator 44 for hot pressing to obtain a finished membrane electrode product, take out the finished membrane electrode product through the manipulator 44 after hot pressing is finished, and store the finished membrane electrode product.

The present invention has the following benefits:

the material A and the material B are subjected to thermal transfer printing, so that an anode catalyst layer on the material B can be thermal transfer printed onto a proton exchange membrane. The material A and the material B are rolled, the anode catalyst layer and the proton exchange membrane are combined more firmly. High-temperature cloth is arranged below the material A and above the material B before the thermal transfer printing, so that the material A and the material B can be subjected to high-temperature protection in the thermal transfer printing process, and the material A and the material B are prevented from being damaged by overheating;

the post-material A after thermal transfer printing is cut into a shaped sheet and is attached to a lower frame material strip, the upper frame material strip is combined with an upper frame material strip, and together, they are rolled and combined to form a semi-finished material strip. Then, carbon paper is respectively attached to the top and the bottom of the semi-finished material strip, heating and rolling combining are performed, and cut into a sheet material in a designed shape, and the sheet material is subjected to hot pressing to form a finished membrane electrode product, so that the finished membrane electrode product has the advantages of simple processing, desired combining effect, high production efficiency and yield. Meanwhile, multiple processes are sequentially integrated, the product of the prior process step is used as the raw material of the subsequent process step, the batch of products of each process can be timely identified, defective products can be timely identified, and timely interception can be realized, adverse impact on the subsequent process and the final finished product can be avoided, and the material waste 1 can be minimized;

the waste material remained after cutting can be wound by employing the waste discharge adhesive tape; the waste material after the PEN hot melt adhesive outline is cut can be rolled by employing the low-viscosity film; and before attaching the post-material A after thermal transfer printing to the lower frame material strip, apply heating to the lower frame material strip, and perform the hot air blow after attaching. This can make the post-material A and the lower frame material strip combined tightly together. In the meantime, it reduces the occurrence of gaps, avoids adverse impact on production quality.

In conclusion, the present invention realizes the continuous automatic production of the membrane electrode and improves the production efficiency and the quality of the membrane electrode.

These examples are for illustration purposes only and are not intended to limit the scope of the present invention. Further, it should also be understood that various alterations, modifications and/or variations can be made to the present invention by those skilled in the art after reading the technical content of the present invention, and all such equivalents fall within the protective scope defined by the claims of the present application.

The invention claimed is:

1. A method for producing a membrane electrode, said method comprising a thermal transfer printing step, a thermal combining step, a carbon paper attaching step and a hot pressing step; wherein said thermal transfer printing step comprises:
   S11: performing thermal transfer printing on a material A and a material B, so that an anode catalyst layer on said material B is thermal transfer printed to a proton exchange membrane of said material A, forming a post-material A after thermal transfer printing;
   S12: performing rolling of said post-material A after thermal transfer printing and said material B to ensure that said anode catalyst layer on said material B is firmly combined with said proton exchange membrane of said material A, and winding said post-material A after thermal transfer printing and rolling;
   wherein said thermal combining step comprises:
   S21: manufacturing an upper frame material strip and a lower frame material strip, discharging said post-material A after thermal transfer printing after winding from step S12 and cutting into designed shape sheets, attaching said post-material A after thermal transfer printing after winding after cutting into sheet shape to the top of said lower frame material strip, applying heating and rolling; and
   S22: placing said upper frame material strip on top of said post-material A after thermal transfer printing, applying heating and rolling to said upper frame material strip, said post-material A after thermal transfer printing and said lower frame material strip together to form a semi-finished material strip, and winding said semi-finished material strip;
   wherein said carbon paper attaching step comprises:
   S31: discharging said semi-finished material strip after winding from step S22, and attaching plurality of carbon paper to the top and the bottom of said semi-finished material strip; and
   S32: by heating and rolling, compounding said semi-finished material strip after attaching said plurality of carbon paper, cutting said semi-finished material strip into a sheet material with a designed shape, and collecting said sheet material;
   and wherein said hot pressing method comprises:
   S41: performing hot pressing on said sheet material collected in step S32 to create a finished membrane electrode product;
   wherein said upper frame material strip and said lower frame material strip in said thermal combining method are manufactured in steps comprising:
      S51: performing rolling and conveying on a pressure-sensitive double-sided adhesive material strip, a release film, and a silicon protective film tape together, performing frame cutting after rolling and conveying, and performing winding of frame scraps after frame cutting; and
      S52: after placing a PEN hot melt adhesive on the surface of said material strip after frame cutting from step S51, performing outline cutting of said PEN hot melt adhesive, performing rolling an included film of said PEN hot melt adhesive after frame cutting, and taking said material strip after frame cutting as an upper frame material strip or a lower frame material strip.

2. A method for producing a membrane electrode according to claim 1, wherein in said manufacturing steps of said upper frame material strip and said lower frame material strip, before said rolled material strip is subjected to frame cutting, a dummy film is arranged above a release film, and performing winding after frame cutting; and
   after frame cutting, a waste discharging adhesive tape is placed above said material strip after frame cutting, and performing winding residual waste material strip after frame cutting through said waste discharging adhesive tape.

3. A method for producing a membrane electrode according to claim 1, wherein in said manufacturing steps of said upper frame material strip and said lower frame material strip, before frame cutting of said PEN hot melt adhesive, placing a low-viscosity film below said silicon protective film tape, and performing winding of scraps from frame cutting of said PEN hot melt adhesive through said low-viscosity film.

4. A method for producing a membrane electrode according to claim 1, wherein in said manufacturing steps of said upper frame material strip and said lower frame material strip, before rolling of said pressure-sensitive double-sided adhesive material strip and said silicon protective film material strip, removing an included paper on a side of said pressure-sensitive double-sided adhesive material strip that is adjacent to said release film, and after rolling, removing an included paper on the other side of said pressure-sensitive double-sided adhesive material strip.

5. A method for producing a membrane electrode, said method comprising a thermal transfer printing step, a thermal combining step, a carbon paper attaching step and a hot pressing step; wherein said thermal transfer printing step comprises:
   S11: performing thermal transfer printing on a material A and a material B, so that an anode catalyst layer on said material B is thermal transfer printed to a proton exchange membrane of said material A, forming a post-material A after thermal transfer printing;
   S12: performing rolling of said post-material A after thermal transfer printing and said material B to ensure that said anode catalyst layer on said material B is firmly combined with said proton exchange membrane of said material A, and winding said post-material A after thermal transfer printing and rolling;
   wherein said thermal combining step comprises:
   S21: manufacturing an upper frame material strip and a lower frame material strip, discharging said post-material A after thermal transfer printing after winding from step S12 and cutting into designed shape sheets, attaching said post-material A after thermal transfer printing after winding after cutting into sheet shape to the top of said lower frame material strip, applying heating and rolling; and
   S22: placing said upper frame material strip on top of said post-material A after thermal transfer printing, applying heating and rolling to said upper frame material strip, said post-material A after thermal transfer printing and said lower frame material strip together to form a semi-finished material strip, and winding said semi-finished material strip;
   wherein said carbon paper attaching step comprises:
   S31: discharging said semi-finished material strip after winding from step S22, and attaching plurality of carbon paper to the top and the bottom of said semi-finished material strip; and
   S32: by heating and rolling, compounding said semi-finished material strip after attaching said plurality of carbon paper, cutting said semi-finished material strip into a sheet material with a designed shape, and collecting said sheet material;

and wherein said hot pressing method comprises:

S41: performing hot pressing on said sheet material collected in step S32 to create a finished membrane electrode product;

wherein in said thermal combining step, before said shaped post-material A sheet after thermal transfer printing is attached with said lower frame material strip, said lower frame material strip is heated, and hot air blowing is performed after attaching; and before said semi-finished material strip is wound, a silicon protective film and inner frame of a PEN hot melt adhesive are rolled, and second protective layers are respectively added to the top of said upper frame material strip and to the bottom of said lower frame material strip.

6. A method for producing a membrane electrode according to claim 5, wherein in said carbon paper attaching step, before said plurality of carbon paper is respectively attached to the top and the bottom of said semi-finished material strip, said second protective layers are added to the top and the bottom of said semi-finished material strip are removed, and third protective layers are added to the top and the bottom of said semi-finished material strip after said plurality of carbon paper is attached.

* * * * *